United States Patent [19]

Epstein et al.

[11] Patent Number: 5,164,465
[45] Date of Patent: * Nov. 17, 1992

[54] SULFONATED POLYANILINE SALT COMPOSITIONS, PROCESSES FOR THEIR PREPARATION AND USES THEREOF

[75] Inventors: Arthur J. Epstein, Bexley; Jiang Yue, Columbus, both of Ohio

[73] Assignee: Ohio State University Research Foundation, Columbus, Ohio

[*] Notice: The portion of the term of this patent subsequent to Aug. 11, 2009 has been disclaimed.

[21] Appl. No.: 426,959

[22] Filed: Oct. 24, 1989

Related U.S. Application Data

[63] Continuation-in-part of Ser. No. 423,902, Oct. 19, 1989, which is a continuation-in-part of Ser. No. 193,964, May 13, 1988, Pat. No. 5,079,334.

[51] Int. Cl.$^5$ ............... C08F 283/00; C08G 283/00; C08G 73/00; H01B 1/00
[52] U.S. Cl. ................... 525/540; 252/500; 428/473.5; 528/422; 528/210; 359/265
[58] Field of Search ............ 350/357; 369/100; 252/500; 428/473.5; 525/540; 528/422, 210

[56] References Cited

U.S. PATENT DOCUMENTS

| | | | |
|---|---|---|---|
| 3,941,810 | 3/1976 | Koebner | 252/518 |
| 4,488,943 | 12/1984 | Skotheim | 204/58 |
| 4,556,623 | 12/1985 | Tamura et al. | 430/73 |
| 4,585,581 | 4/1986 | Skotheim | 252/518 |
| 4,586,792 | 5/1986 | Yang et al. | 350/357 |
| 4,604,427 | 8/1986 | Roberts et al. | 525/185 |
| 4,615,829 | 10/1986 | Tamura et al. | 528/490 |
| 4,636,430 | 1/1987 | Moehwald | 428/304.4 |
| 4,742,867 | 5/1988 | Walsh | 165/96 |
| 4,749,260 | 6/1988 | Delery et al. | 350/357 |
| 4,822,638 | 4/1989 | Yaniger | 427/79 |
| 4,851,487 | 7/1989 | Yaniger et al. | 525/540 |
| 4,855,361 | 8/1989 | Yaniger | 525/436 |
| 4,935,164 | 6/1990 | Wessling et al. | 252/500 |
| 4,973,391 | 11/1990 | Madou et al. | 204/78 |

FOREIGN PATENT DOCUMENTS

61-197633 2/1985 Japan.

OTHER PUBLICATIONS

Paul, et al., J. Phys. Chem. 89:1441-1447 (1985).
Stafstrom et al., Phys. Rev. Lett. 59:1464 (1987).
Rice et al., Phys. Rev. Lett., 49:1455 (1982).
Bredas et al., Phys. Rev., B29:6761 (1984).
Chiang et al., Synth. Met. 13:193 (1986).
Ginder et al., Solid State Commun., 63:97 (1987).
Epstein et al., Synth. Met., 18:303 (1987).
Choi et al., Phys. Rev. Met., 59:2188 (1987).
Skoptheim et al., Electrochem. Soc., 132:246 (1985).
Obayashi et al., Adv. Chem. Ser., 163;316 (1977).

(List continued on next page.)

Primary Examiner—John Kight, III
Assistant Examiner—T. Mosley
Attorney, Agent, or Firm—Emch, Schaffer, Schaub & Porcello Co.

[57] ABSTRACT

Sulfonic acid-substituted polyaniline salt compositions, processes for their preparation and uses therefor are disclosed. The sulfonated polyaniline salt compositions have fast electronic and optical responses to electrochemical potentials, improved environmental stability, and improved solubility. A process for producing the sulfonated polyaniline salt compositions comprises reacting a sulfonated polyaniline polymer with an aqueous basic solution. The sulfonated polyaniline compositions are useful for absorption of electromagnetic radiation, as a high density erasable data storage medium for use in information storage and processing applications, and to provide electronic, chemical, electrochemical, and optical microelectronic devices which use and control the chemical and physical properties of the sulfonated polyaniline salt compositions.

12 Claims, 4 Drawing Sheets

OTHER PUBLICATIONS

Sammels et al., J. Electrochem. Soc., 131:617 (1984).
Chao et al., J. Am. Chem. soc., 109:6627 (1987).
Hardy et al., J. Am. Chem. Soc., 1071:3823 (1985).
Gregory et al., Synthetic Metals, 28:C823–C835 (1989).
Nakajima et al., Synthetic Metals, 28:C629–C638 (1989).
Mizumoto et al., Synthetic Metals, 28:C639–C646 (1989).
Angelopoulos et al., J. Vac. Sci. Technol. B7 (6) Nov./Dec. 1989.
Lacroix et al., J. Electrochem. Soc., 136:1308–1313 (1989).
Computer search performed in the 1989 Am. Chem. Soc., (1989).
Chem. Abstracts, 106:33982g (1987).
WPI Data Base Search of JP patent No. 61-197633.
Noshay et al., J. App. Polymer Sci., 20:1885–1903 (1976).
Declaration of Arthur J. Epstein.

Structure a
Compound I

Structure b
Compound II

Structure c

Structure d

Structure e

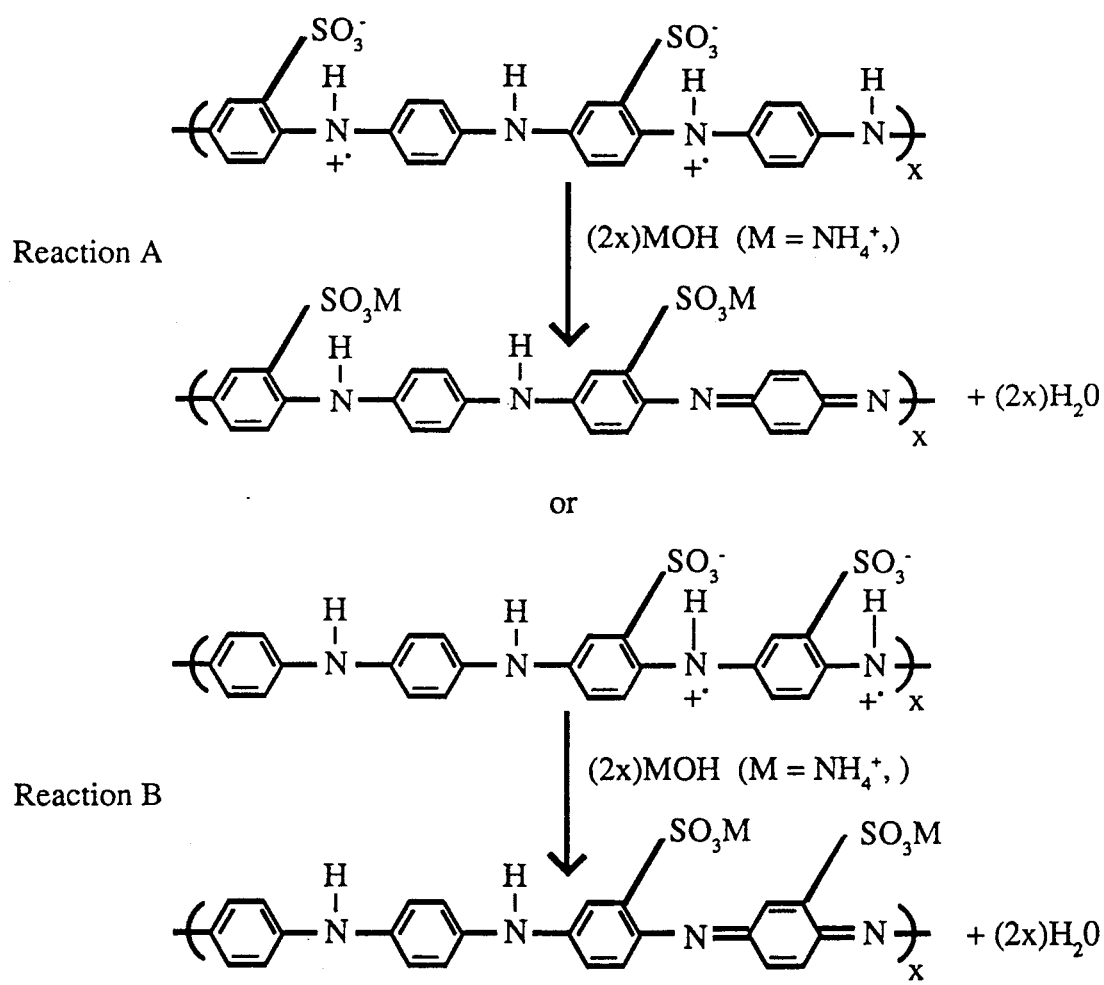

SULFONATED POLYANILINE SALT COMPOSITIONS, PROCESSES FOR THEIR PREPARATION AND USES THEREOF

BACKGROUND OF THE INVENTION

The present invention is a continuation-in-part of co-pending application Ser. No. 07/423,902 which was filed on Oct. 19, 1989 which is a continuation-in-part of co-pending application Ser. No. 193,964 which was filed on May 13, 1988, now U.S. Pat. No. 5,079,334.

The present invention relates to sulfonic acid-substituted polyaniline salt compositions, their derivatives, processes for their preparation, and uses thereof.

Polyaniline is a family of polymers that has been under intensive study recently because the electronic, chemical and optical properties of the polymers can be modified through variations of either the number of protons, the number of electrons, or both. The polyaniline polymer can occur in several general forms including the so-called reduced form (leucoemeraldine base), possessing the general formula

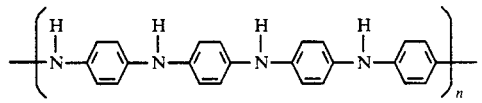

the partially oxidized so-called emeraldine base form, of the general formula

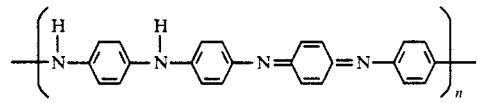

and the fully oxidized so-called pernigraniline form, of the general formula

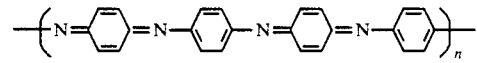

In practice, polyaniline generally exists as a mixture of the several forms with a general formula (I) of

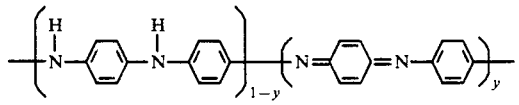

When $0 \leq y \leq 1$, the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of y=1. The fully oxidized poly(paraphenyleneimine) is referred to as pernigraniline, of repeat unit shown above corresponds to a value of y=0. The partly oxidized poly(paraphenyleneamineimine) with y in the range of greater than or equal to 0.35 and less than or equal to 0.65 is termed emeraldine, through the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

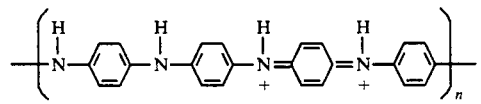

which may be rewritten as

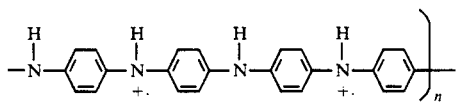

Formally, the degree of protonation may vary from a ratio of $[H^+]/[-N-]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes. (E. Paul, et al., *J. Phys. Chem.* 1985, 89, 1441–1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt $[(-C_6H_4-NH-C_6H_4-NH^+)-Cl^-]_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

The present invention is related to the invention disclosed in the co-pending application Ser. No. 305,872, which was filed on Feb. 2, 1989 and is incorporated herein by reference. That application discusses an optical information storage process which provides for erasable high density optical data storage which can be used in information storage and processing applications. The powerful information storage process is based upon the photoexcited optical transformations resulting from the optical absorptions of polyaniline.

While the preparation of sulfonated polyaniline compositions which are capable of being "self-protonated" or "self-doped" is disclosed in the parent application Ser. No. 07/423,902, filed on Oct. 19, 1989, it is novel herein to prepare sulfonated polyaniline salt compositions.

SUMMARY OF THE INVENTION

The present invention provides nonprotonated sulfonated polyaniline salt compositions which are electrically insulating polymers and which are easy to dissolve in aqueous solutions. The present invention also relates to a process for producing the nonprotonated sulfonated polyaniline salt compositions which comprises reacting a sulfonated polyaniline polymer with a basic solution, such as NaOH, KOH and the like. The sulfonated polyaniline salt compositions are very soluble in water at high densities and are therefore useful as interim materials in producing self-protonated sulfonated polyaniline compositions.

The present invention further relates to the use of sulfonated polyaniline and derivatives thereof for absorbing electromagnetic radiation, including microwaves, radar waves, infrared waves, visible waves, and ultraviolet waves as needed. The invention further relates to the use of the radiation-absorbing sulfonated polyaniline compositions to modulate another electromagnetic beam.

The invention further relates to the use of the sulfonated polyaniline salt compositions as a high density erasable data storage medium intended for use in information storage and processing applications.

The present invention also relates to a method for the bit-wise or total erasure of the stored information. Further, the present invention relates to a method for the "layering" of information stored. As the intensity of the photoinduced (write beam produced) change in absorption is proportional to the intensity of the write beam, discrimination of the amount of photoinduced optical absorption by the read beam enables more than one bit (0,1) to be written at a single bit location.

The present invention and the sulfonated polyaniline salt materials described herein may also be used to provide a medium for recording of hologram as done for example in photorefractive $Bi_{12}SiO_{20}$ [J. P. Herriau and J. P. Huignard, Appl. Phys. Lett. 49, 1140 (1986)] and $BaTiO_3$ [J. Feinberg, Physics Today, 41 (10) 46 (1988)]. This technique allows for storage of information in a form of photoinduced fixed gratings within the sulfonated polyaniline salt material and formation of holographic images.

BRIEF DESCRIPTION OF THE DRAWINGS

FIG. 5 is a schematic illustration of the equilibrium between self-doped sulfonated polyaniline and its base form in aqueous $NH_4OH$ solution.

DETAILED DESCRIPTION OF THE INVENTION

The present invention relates to sulfonic acid substituted polyaniline salt compositions, their derivatives, processes for their preparation and uses thereof.

The sulfonated polyaniline salt compositions have the formula I

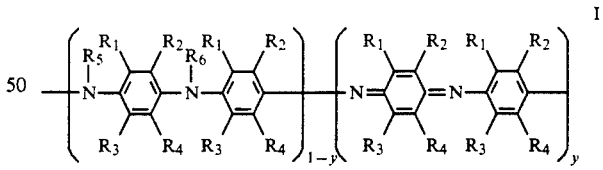

wherein $0 \leq y \leq 1$; $R_1$, $R_2$, $R_3$, $R_4$, $R_5$ and $R_6$ are independently selected from the group consisting of H, $-SO_3H$, $-R_7SO_3H$, $-SO_3M$, $-R_7SO_3M$, $-OCH_3$, $-CH_3$, $-C_2H_5$, $-F$, $-Cl$, $-Br$, $-I$, $-NR_{72}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1$-$C_8$ alkyl, aryl or aralkyl group and M is a positive cation or counterion, for example $NH_4^+$, Li, $Na^+$, $K^+$, $Rb^+$, $Cs^+$, $Ca^{++}$, $Ba^{++}$ and the like; and wherein x is that fraction of phenyl or quinoid rings that have an $-SO_3^-$ group and where z is that fraction of these phenyl or quinoid rings that have the M positive cation; such that when z is much less than x, the composition is a conductor and as z approaches x, the composition becomes nonconducting.

The fraction of rings containing at least one $R_1$, $R_2$, $R_3$ or $R_4$ groups being an $-SO_3M$, or $-R_7SO_3M$ can be varied from a few percent to one hundred percent. In certain embodiments the percentage ranges from at least approximately 20% up to and including 100%. It is within the contemplated scope of the present invention that the $-R_7SO_3M$ substituents can be varied so that the sulfonated polyaniline is soluble in a range of solvents in order to make the sulfonated polyaniline salt composition more easily blendable with other polymers and/or more easily cast onto a variety of surfaces. The sulfonated polyaniline composition is of weight average molecular weight in the range of from approximately 300 (oligomers of sulfonated polyaniline) to in excess of 100,000 as measured by laser light scattering of sulfonated polyaniline. Static light scattering light measurements as a function of solution concentration and angle were made at room temperature with a Brookhaven B1200SM spectrometer and B12030AT Correlator using as a light source an Argon ion laser operating at a wavelength of 5145A.

The present invention discloses herein the synthesis, the electronic, electrochemical and optical properties of sulfonated polyaniline salt compositions. The sulfonated polyaniline has a conductivity of 0.5 S/cm without external doping which makes the sulfonated polyaniline a self-protonated conducting polymer. It is disclosed herein that, in contrast, a salt ($Na^+$ or $K^+$, for example) of the sulfonated polyaniline is a non-protonated insulating polymer.

The chemical synthesis of the sulfonated polyaniline salt compositions of the present invention is accomplished by reacting sulfonated polyaniline with a basic solution.

Figure 4:
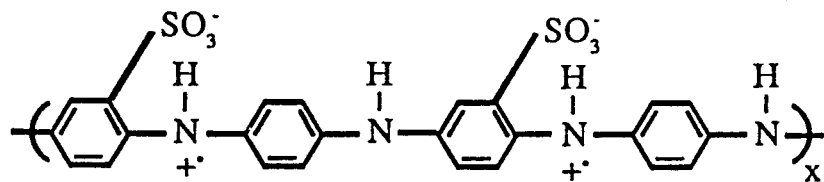
FIG. 4 is a schematic illustration of the equilibria among different structures of self-doped sulfonated polyaniline.
Figure 4:
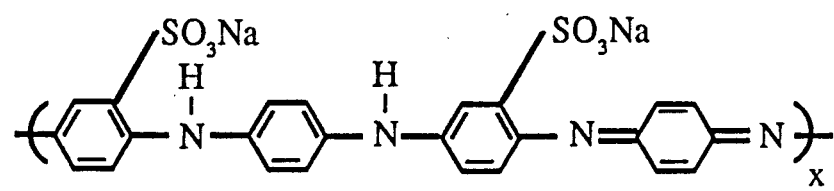
Figure 4:
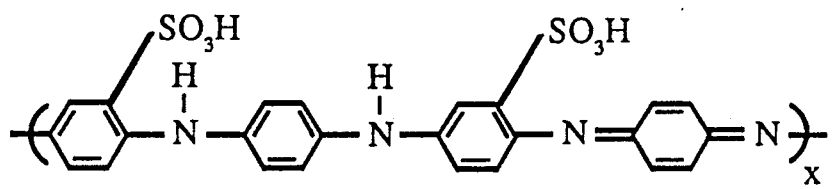
Figure 4:
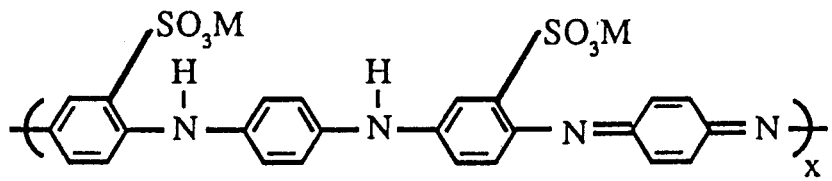
Figure 4:
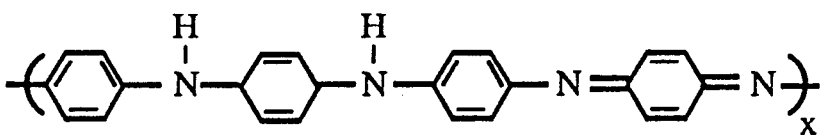

An example of the synthesis of sulfonated, non-protonated sodium polyaniline salt follows: 1 g of sulfonated, protonated polyaniline in the emeraldine oxidative state (structure a, compound I, in FIG. 6) was dissolved in 40 ml 0.1M NaOH solution. The color of the solution was blue-violet. The water was removed from the solution by slowly reducing the pressure of the polymer solution at room temperature. After most of the water was gone, the polymer was transferred to a vacuum desicator and dried under dynamic vacuum for 24 hours. The sulfonated, non-protonated sodium polyaniline salt, shown as structure b, compound II, in FIG. 4 was then obtained.

Infrared and electronic spectra. Infrared spectra were obtained by mixing the either compound I or the compound II into KBr matrix, pressing into pellets and recording on an FTIR spectrometer.

For taking electronic spectra the compound I was dissolved in 0.1M NH$_4$OH to form a homogeneous solution, the polymer solution was then cast on a quartz substrate. Slow evaporation of the aqueous solution of the compound II (ammonium salt) in air at room temperature resulted in spontaneous removal of the weak volatile base, NH$_3$ with reformation of the compound I. Compound II was dissolved in either H$_2$O/NMP(N-Methyl 2-Pyrrolidinone/solution for taking the spectra.

Conductivity measurement. Conductivities of the compound I and compound II were measured on compressed pellets of the powder by using four point probe techniques with a Keithley 220 constant current source and Keithley 181 voltmeter.

Cyclic voltammetry studies. Cyclic voltammetry studies were carried out using a Hokto Corporation (HC) Model HA-301 potentiostat/galvanostat with HC HC-201 digital coulometer. The HC HB-111 universal programmer was used for the generation of the sweep signals which were fed into the HA-301. Voltammograms were recorded on a Hewlett-Packard Model 7046B XYY' recorder with an optional time base function. For the studies of current peak changing with the sweep rate, a Nicolet Model 370 digital oscilloscope with digitizer and disk-drive plug-in was used for recording $i_p$ in the high frequency characterization experiments. A standard three electrode system was enclosed in a dual compartment cell with a fine porosity glass frit separating the working electrode and reference electrode from the counter electrode. Platinum disks (1.0 cm$^2$) were used as working and counter electrodes. A Ag/AgCl, saturated KCl electrode encased with a luggin probe was used as a reference electrode. 1.0M HCl(20 ml) was used as the electrolte. All studies, except scan rate dependence of current peak, were performed at a sweep rate of 50 mV/s. Since preliminary observations indicated that air did not have any effect on the cyclic voltammograms, all operations were carried out in the presence of air.

The compound I was cast on a Pt electrode by evaporating a solution of the polymer in 0.1M ammonium hydroxide and subsequently dried in air. In order to obtain reproducible cyclic voltammograms the electrode was preconditioned by cycling between $-0.2$ and 0.4 volts vs Ag/AgCl for $\sim 10$ minutes (25 cycles).

Structure Characterization and Physical Properties. Elemental analyses, infrared and electronic spectroscopy, conductivity and cyclic voltammetry studies are consistent with the sulfonation of emeraldine base with fuming sulfuric acid proceeding to give a self-doped, sulfonated, protonated forms of the emeraldine oxidative state of polyaniline, the compound I (shown as structure a in FIG. 4) which has a conductivity of $\sim 0.5$ S/cm. This polymer can be regarded as being formed by the hypothetically initial formation of the strong acid, shown as structure c in FIG. 4, which then immediately protonates the imine nitrogen atoms to give the conducting polymer in an entirely analogous manner to strong acids such as HCl. Treatment of the structure c compound with an aqueous base yields the sulfonated, non-protonated insulating salt forms analogous to emeraldine base, viz, the structure d compound shown in FIG. 4.

Figure 1:
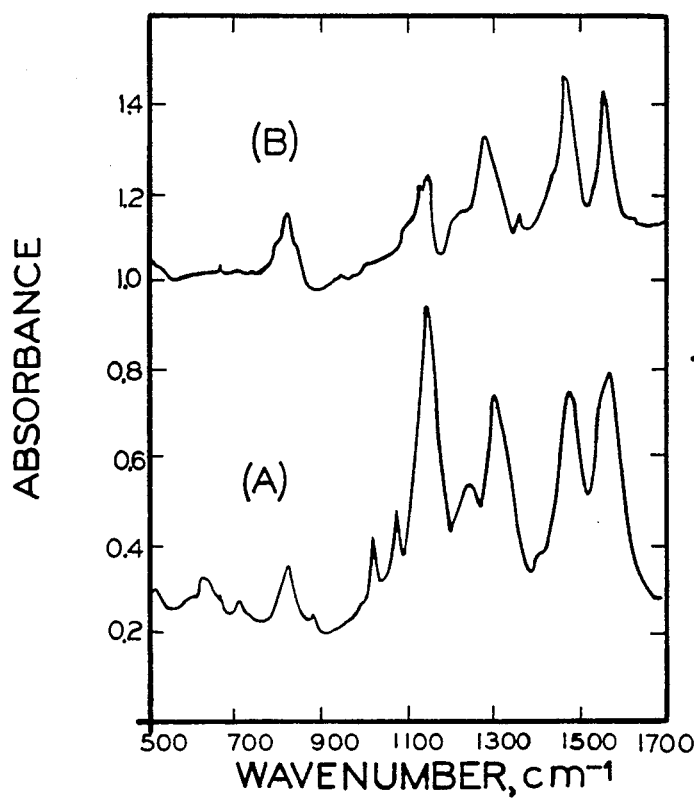
FIG. 1 is a graph illustrating the FTIR spectra of (a) self-doped sulfonated polyaniline; (b) emeraldine base, the parent polymer of sulfonated polyaniline in wave numbers $cm^{-1}$.

With respect to the above structure, sulfonation occurs preferentially in alternating rings and that under the present experimental conditions, only half the rings were sulfonated. This is consistent with the increased stability of the semiquinone form. Further sulfonation and consequently double protonation of nitrogen atoms convert some of the —(NH)—to—(NH$_2^+$)— and hence reduce the conjugation of the polymer. The FTIR spectrum shown in FIG. 1 of the self-doped polyaniline, the compound I, is consistent with the presence of —SO$_3^-$ groups alternated to the aromatic rings. IR shows absorption maxima of out of plane bending of aromatic hydrogens at 820 and 870 cm$^{-1}$ are indicative of 1, 2, 4 trisubstitutents on the rings. The absorptions are not present in the 1, 2 disubstituted emeraldine base from which the compound I was synthesized. Absorption peaks at 1080, 700 and 590 cm$^{-1}$ are consistent with the presence of SO$_3^-$ groups.

The conductivity of the compound I ($\sigma \sim 0.5$ S/cm) is similar to that of emeraldine hydrochloride measured under the same experimental conditions ($\sigma \sim 1-5$S/cm; laboratory air), but lower than that $\sigma \sim 18$S/cm of high molecular weight emeraldine hydrochloride. The self-doped sulfonated polyaniline with emeraldine oxidative state differs dramatically from nonexternally doped polyaniline, structure e shown in FIG. 4, in conductivity. Since sulfonic acid is a strong acid, approximately as strong as hydrochloric acid, the compound I is capable of doping itself. Pressed pellets of the dark green self-doped compound I had a room temperature conductivity of $\sim 0.5$S/cm in contrast to the purple color and insulating behavior of polyaniline emeraldine base form. However, the conductivity of compound I is lower than that of emeraldine hydrochloride pressed pellets; analogy with earlier study of poly(o-toluidine), the lower conductivity is in accord with increased conduction electron localization induced by the side chain effects of $-SO_3^-$.

The solubility of the compound I and compound II also differ markedly from that of the corresponding polyaniline polymer. The compound I dissolves completely in aqueous 0.1M $NH_4OH$ or $NaOH$ to give a blue-violet solution while polyaniline washed with such solvent converts to the insoluble base form. When in the basic aqueous solvent, the polymer backbone is in the emeraldine base structure with $SO_3^-$ forming a salt with $NH_4^+$ or $Na^+$, i.e. compound II. The compound I partially dissolves in NMP to form a blue color solution and as well as DMSO (dimethyl sulfoxide) to show green color. The compound II dissolves in the water showing a blue-violet color and $H_2O$/NMP forming a blue solution. The compound II also partially dissolves in NMP with blue color and in DMSO with dark blue color. Treatment of the self-doped polyaniline, compound I, with an aqueous base proceeds consequently to the deprotonation of the backbone of the polymer to form the structure corresponding to emeraldine base, as shown in the reaction A or reaction B depicted in FIG. 5.

In both cases the deprotonation results in a 9 or 10 order of magnitude decrease in conductivity. The sulfonated, non-protonated polyaniline salt composition is analogous to the emeraldine base (shown as structure e in FIG. 4), except that it is a salt combining two anionic $-SO_3^-$ groups per four (ring-N) units. Compound I and II differ from emeraldine hydrochloride in that they are soluble in aqueous 0.1M $NH_4OH$ and $NaOH$. The anionic polymer chain present in the compound II is responsible for its solubility in water.

Based on solid state $^{13}C$ NMR studies, [T. Hjertberg, W. R. Salaneck, I. Landstrom, N. L. D. Somasiri and A. G. MacDiarmid, *J. Blymer Sci; Polym. Lett. Ed.*, 23 (1985) 503] it has been reported that adjacent phenyl rings of the emeraldine backbone are noncoplanar. Introduction of sulfonic acid groups on phenyl rings of the polyaniline backbone can be expected to increase the torsional angle between adjacent rings to relieve steric strain.

Figure 2:
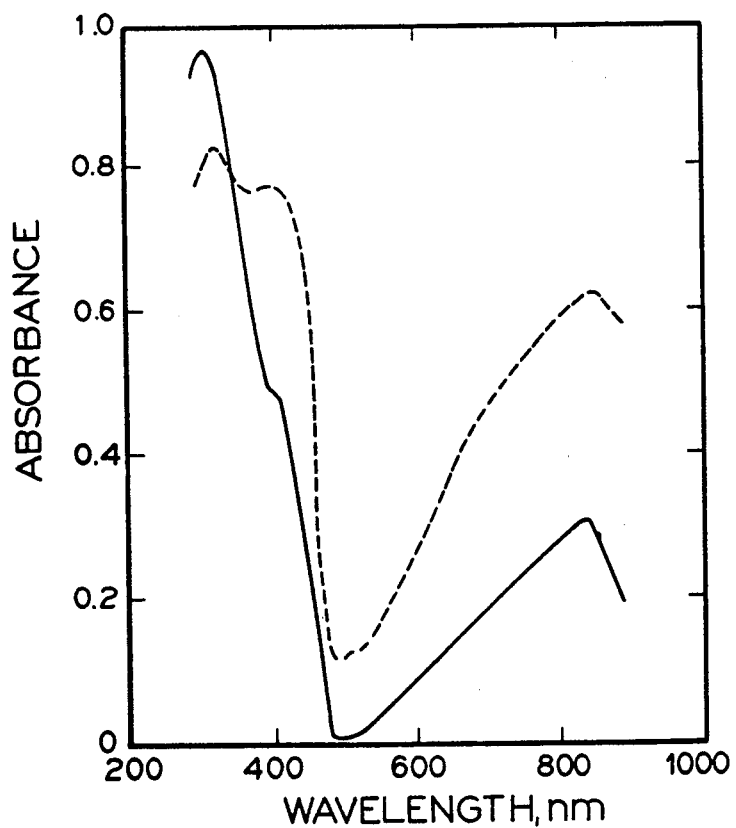
FIG. 2 is a graph illustrating the electronic absorption spectra of (a)—sulfonated polyaniline film cast from an aqueous $NH_4OH$ solution in a quartz substrate, then dried in air, (peaks at 3.88 and 2.16 eV in 0.1M $NH_4OH$; (b)—emeraldine salt film, (peaks at 3.76 and 2.0 eV) in NMP.

Comparisons of the electronic absorption spectra of the compound I and the emeraldine salt, and compound II and emeraldine base provide insight into changes in the molecular geometry caused by the sulfonic group-substitution on the polyaniline backbone. Steric effects are considered in the interpretation of the electronic absorption spectra of the sulfonated polyaniline. In order to compare the feature of the electronic spectra of the self-doped polymer (compound I) and emeraldine hydrochloride, their spectra are given in FIG. 2. The high energy absorption band at 320 nm (3.88 eV) and 326 nm (3.81 eV) for compound I and emeraldine hydrochloride, respectively, is assigned to the pi-pi* transition based on earlier experimental and theoretical studies. The other two absorption bands at 435 nm (2.38 eV) and 850 nm (1.46 eV) for the compound I, 413 nm (300 eV) and 826 nm (1.50 eV) for emeraldine hydrochloride, have been assigned to the optical absorption of the metallic polaron band of the salt form. The hypsochromic shift of the pi-pi* transition in going from emeraldine hydrochloride to compound I is again in accord with decreased extent of conjugation caused by increased phenyl ring torsion angle which results from steric repulsion between the $-SO_3^-$ groups and hydrogens on the adjacent phenyl rings. The bathochromic shift of the polaron band transition is also in agreement with relative energy band shifts expected for increased ring torsion angles.

Temperature dependent electron spin resonance studies show a $\sim 0.4$ G peak to peak linewidth for compound I at room temperature similar in intensity to that of emeraldine salt. This result support that compound I is in the polysemiquinone (polaron energy band) state.

Figure 3:
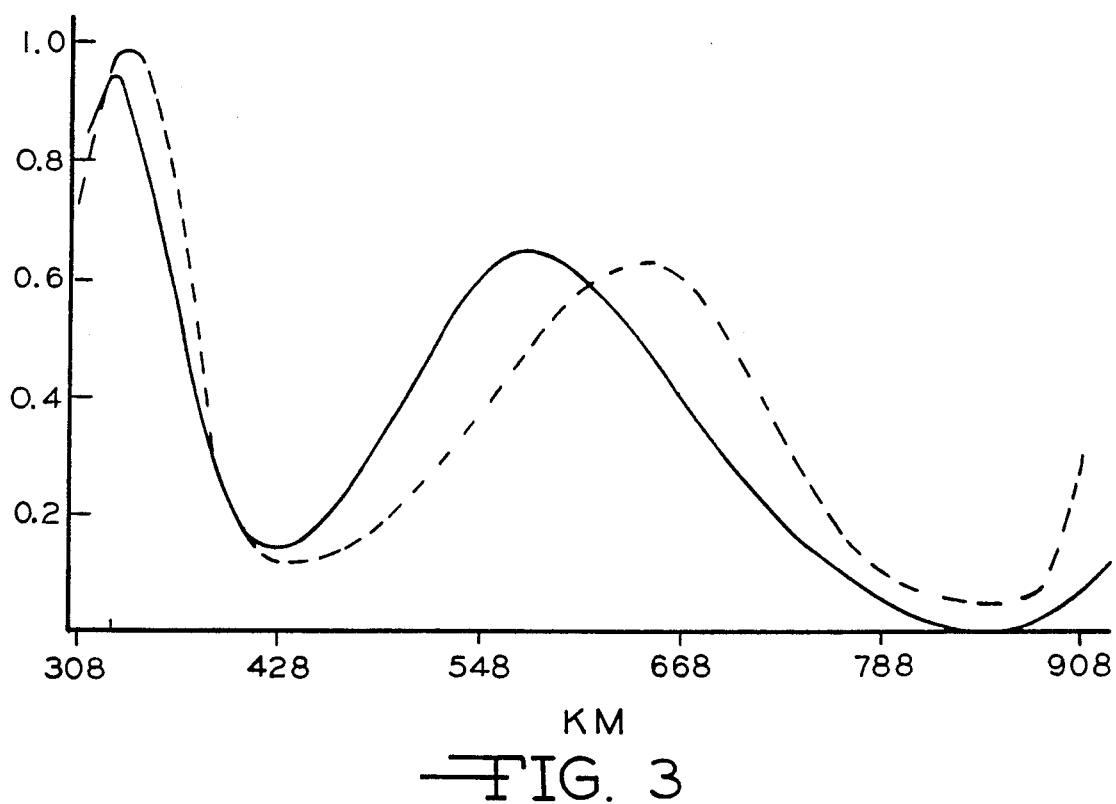
FIG. 3 is a graph illustrating the electronic absorption spectra of (a)—sulfonated polyaniline in $NH_4OH$, maxima at 320 nm (3.88 eV) and 563 nm (220 eV); (b)—emeraldine base in NMP, maxima at 330 nm (3.76 eV) and 620 nm (200 eV).

The electronic spectra of compound II and emeraldine base consist of two major absorption bands as shown in FIG. 3. The first absorption band at 320 nm (3.88 eV) and 330 nm (3.76 eV) for compound II and emeraldine base, respectively, is assigned to the pi-pi* transition based on the earlier studies of polyaniline. This absorption shifts somewhat with increasing oligomer length. The pi-pi* transition band shows a hypsochromic shift from 3.76 eV for emeraldine base to 3.88 eV for compound II. The blue shift implies the decrease of the extent of the conjugation and an increase of the band gap of this polymer. The adjacent phenyl rings of the polymer have larger C—N=C angles with respect to the plane of the nitrogens due to the possible steric repulsion between $-SO_3^- Na^+$ groups and hydrogens on the adjacent phenyl rings. The second absorption band at 563 nm (2.20 eV) and 620 nm (2.00 eV) for compound II in $H_2O$ and emeraldine base in NMP, respectively, also has a substantial hypsochromic shift with sulfonation. This band has been assigned to an absorption from the highest occupied molecular orgital (HOMO) based band centered on the benzenoid units to the lowest unoccupied molecular orbital (LUMO) centered on the quinoid units. When the absorption is intrachain, the excitation leads to formation of a "molecular" exciton (with positive charge on adjacent benzenoid units bound to the negative charge centered of the quinoid), while interchain charge transfer from HOMO to LUMO may lead to formation of positive and negative polarons. The increase in this transition energy is also in accord with increased ring torsion angles due to steric repulsion.

The sulfonation of polyaniline has dramatic changes in its solubility and solution properties. For example, compound II dissolved in water gave a 2.20 eV absorption however, the transition of such band is changed from 2.20 eV to 2.00 eV by adding NMP into the solution. The origin of this is that water is a more polar solvent with smaller volume comparing to NMP, hence it partially solvates the imine nitrogens resulting in larger torsional angle, causing the hypsochromic shift.

The present invention further relates to the uses of the sulfonated polyaniline salt compositions and their derivatives in electronic, electrochemical, chemical, and optical applications.

The sulfonated polyaniline salt compositions can be coated by a variety of techniques onto substrates of choice. The sulfonated polyaniline salt compositions can be applied to substrates according to the present invention by spray coating, dip coating, spin casting, transfer roll coating, brush-on coating, and the like. The sulfonated polyaniline polymers can also be electrochemically deposited onto conductive substrates by known electrochemical deposition techniques.

The sulfonated polyaniline salt compositions of the present invention are useful as an interim material in the making of self-protonated sulfonated polyaniline compositions. The sulfonated polyaniline salt compositions are very soluble in water, while the sulfonated polyaniline compositions are only slightly soluble in water. For example, the sulfonated polyaniline salt compositions can be dissolved in water at very high densities and can be very uniformly applied to a substrate. After application to the substrate the insulating sulfonated polyaniline salt composition can be converted to the conducting sulfonated polyaniline composition. In the case where the counterion is, for example, $NH_4^+$, the $NH_4^+$ can be evaporated off. In the case where the counterion is $Na^+$, is dissolved or washed off by using an acid such as, for example HCl where the $Na^+$ is then replaced by the proton $H^+$.

The sulfonated polyaniline salt compositions and derivatives thereof have, or can be designed to have, desired processability in terms of, for example, viscosity, flexural strengths, solubility, adhesion to substrates, crosslinking, melting point, weight, adaptability to filler loading and the like. This is achieved by varying as desired the degree of protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer, facilitating the tunability of the sulfonated polyaniline salt composition for non-linear optics applications, and for specific wavelength absorption, such as microwave attenuation or a particular photoresponse.

The present invention is therefore especially useful for absorbing electromagnetic radiation, wherein the electromagnetic radiation possess a wavelength generally in the range of from about 1000 Angstroms to about 50 meters, wherein the composition comprises a sulfonated polyaniline composition or a protonated salt thereof.

The sulfonated polyaniline salt compositions of the present invention are useful in preparing gradients of conductivity. The conductivity of the material can be varied by varying the density of the positive cation (e.g. $Li^+$, $Na^+$, $K^+$, $Rb^+$, $Cs^+$, $NH_4^+$, $Ca^{++}$ and the like) from 0 to 0.5 per phenyl or quinoid ring. As such, the composition changes from conducting to insulating as the number of positive cations approaches the number of sulfonyl groups in the compositions. Thus, by varying the ratio of conducting to nonconducting, a gradient of conductivity is established: where x is that fraction of phenyl or quinoid rings that have an —$SO_3^-$ group, and where z is the fraction of these phenyl or quinoid rings that have a positive cation; when z is much less than x, the compound is a conductor and as z approaches x, the compound becomes nonconducting or insulating. Therefore, one can vary the conductivity by varying the z/x ratio.

The present invention is also useful with various devices such as optical devices and microwave devices which utilize the features, characteristics and properties of the sulfonated polyaniline salt compositions which are described in the parent co-pending patent application. For the purposes of illustration only, various example are given below. It should be understood that these examples are not limiting and that the sulfonated plyaniline salt compositions can also be used in other such applications as are known to those skilled in the art, including but not limited to the further examples given in the parent co-pending application.

EXAMPLE

In one embodiment of the method for reducing the detectability by radar of an object it is desirable to coat the object in such a way as to produce a gradient of absorption to minimize reflectance. Such a gradient of sulfonated polyaniline material can be achieved by varying the degree of self-protonation of the sulfonated polyaniline polymer or the degree of substitution on either the $C_6$ ring or the nitrogen atoms or both with a chemical substituent such that an incoming radar beam first encounters a sulfonated polyaniline composition with little or no self-protonation, i.e., a material with limited absorption of radiation. As the beam further advances along the gradient of sulfonated polyaniline material covering the object, the beam encounters sulfonated polyaniline polymer with continually increasing degrees of self-protonation, and hence increasing degrees of electromagnetic absorption. The gradient of self-protonation can be controlled through the gradient of sulfonation or by having constant sulfonation vary the gradient of $Na^+$ or other counterions. In this manner, little or no reflection of the beam is produced and the object is not detectable by a radar wave reflection.

EXAMPLE

Sulfonated polyaniline compositions can also be used as a photoactive switch by manipulation of the index of refraction of the sulfonated polyaniline compositions. The extremely rapid photoresponse of the sulfonated polyaniline polymer, makes such polymer useful in nonlinear optical devices. The time dependence of the photo bleaching of the polymer is on the order of picoseconds. For example, the application of a laser beam of wavelength 6200 Angstroms (2.0 eV) to sulfonated polyaniline polymer in emeraldine form (for example $Na^+$ salt) produces significant photoinduced bleaching (i.e., increased transmission) in broad energy bands of 8,265 Angstroms to 4,590 Angstroms (approximately 1.5 eV to 2.7 eV) and again at 3,760 Angstroms to 2,880 Angstroms (approximately 3.3 eV to 4.3 eV). Simultaneously laser beam photoinduced absorption (i.e., decreased transmission) for sulfonated polyaniline occurs at 24,800 Angstroms to 8,265 Angstroms (approximately 0.5 eV to 1.5 eV) and from 4,590 Angstroms to 3,760 Angstroms (2.7 eV to 3.3 eV). Photoinduced absorption and bleaching occur in sulfonated polyaniline compositions in less than $10^{-12}$ seconds. These photoinduced changes in absorption correspond to changes in the index of refraction at these wavelengths. These changes in optical constants have broad application in nonlinear optical signal processing and optical communications, which according to the present invention, are useful as means to switch, modulate, multiplex, focus, and provide optical bistability for commercial systems.

EXAMPLE

Sulfonated polyaniline is also useful in nonlinear optical signal processing. For example, a thin film coating of a sulfonated polyaniline salt composition can be applied to a phototransmissive substrate. A probe beam of light of a given wavelength is then propagated through the noncoated side of the substrate onto the coating at the critical angle to the sulfonated polyaniline salt such that the probe beam is wave-guided in the phototransmissive substrate. To activate the desired switching property of the sulfonated polyaniline salt coating, a pump beam of light, also called a modulator, of a different wavelength or some wavelength is applied to the coating through the coated or noncoated side of the substrate at a second angle such that the index of refraction of the sulfonated polyaniline composition is changed by the absorption by the sulfonated polyaniline of the electromagnetic radiation of the modulator beam. The wavelength of the modulator beam can vary widely, but for the emeraldine base form (for example Na+ salt) it is preferably within the range of from about 8265 Angstroms (1.5 eV) to about 4590 Angstroms (2.7 eV). The change in the refractive index of the sulfonated polyaniline composition coating alters the transmissive property of the sulfonated polyaniline composition coating alters the transmissive property of the sulfonated polyaniline and allows the probe beam to be refracted or otherwise modified by the sulfonated polyaniline coating. This refraction or other modification of the probe beam can, for example, be used to trigger a photocell, initiate or terminate an optical signal, encode information on the probe beam, or the like. By these means is produced a low cost, stable means of optical signal processing.

EXAMPLE

In another embodiment, a beam to be modulated is caused to impinge upon a thin coating of sulfonated polyaniline which is on a phototransmissive substrate. A portion of the beam is reflected, the remainder refracted, transmitted, and partly absorbed. Application of a modulator beam at a second angle changes the index of refraction of the sulfonated polyaniline thereby altering the direction and the percentage of the probe beam transmitted and reflected. One embodiment has the probe beam incident on the sulfonated polyaniline in its emeraldine base form (for example, Na+ salt) at a critical angle and the modulator beam preferably of wavelength between 8265 Angstroms (1.5 eV) and 4590 Angstroms (2.7 eV).

Thus, the present invention further relates to a method of changing the refractive index of sulfonated polyaniline comprising (a) applying sulfonated polyaniline to a phototransmissive substrate; (b) applying a first beam of light of wavelength x at the critical angle y to the sulfonated polyaniline surface; and, (c) applying a second beam of light of wavelength z to the sulfonated polyaniline surface, whereby the second beam is absorbed by the sulfonated polyaniline changing the index of refraction of the sulfonated polyaniline, whereby the transmission of the first beam through the phototransmissive substrate is altered. The preferred wavelength x of the first or probe beam of light is dependent on the form of sulfonated polyaniline utilized. For emeraldine base polymer, the preferred wavelength x of the first or probe beam of light is in one or more of the ranges of approximately 0.6 eV to 4.3 eV; 0.8 to 1.1 eV; 1.3 to 1.6 eV; 1.7 to 2.4 eV; 1.6 to 2.4 eV; 2.8 to 3.2 eV; and 3.4 to 4.3 eV. The preferred wavelengths will vary depending on the degree of self-protonation and oxidative state of the sulfonated polyaniline polymer and the nature of the substituents, if any, on the polymer. For the emeraldine base polymer, the preferred wavelength z of the second or modulating beam of light is in the range of approximately 1.7 eV to 2.7 eV. The preferred wavelength of the second or modulating beam is determined by the oxidation state, self-protonation level, and substituents of the polymer. For the leucoemeraldine polymer the preferred wavelengths of the probe beam are in the range of 24,800 Angstroms to 8,265 Angstroms (0.5 to 1.5 eV) and 4,590 Angstroms and 3,760 Angstroms 2.70 to 3.30 eV, with shorter preferred modulator beam wavelength of 3,760 Angstroms to 2,880 Angstroms, 3.30 to 4.30 eV. For pernigraniline base, the preferred probe and modulator wavelength are similar to those of emeraldine base.

EXAMPLE

The ability to permanently alter at will the absorption characteristics of sulfonated polyaniline through the application of light or electrochemical potential provides a powerful technology for use in information storage. For instance, the focused writing beam of a low power helium neon laser operating at 632.8 nm (1.69 eV) may be used to write information on a thin (less than 1 micron) film of sulfonated polyaniline in the emeraldine form, (e.g., Na+ salt), thereby inducing a large increase in the optical absorption in the near infrared spectral region that can be read conveniently by an inexpensive compact semiconductor diode laser operating at 800 nm, 1300 nm, or 1550 nm.

Transmission characteristics of the photoinduced absorption in sulfonated polyaniline compositions in the emeraldine form are also dependent upon the writing laser input intensity. That is, the amount of photoinduced absorption is proportional to the intensity of the writing laser. This ability to "stack" the transmission characteristics of the shifted photoabsorption spectrum of sulfonated polyaniline provides the capability to "stack" information storage at one given bit location on a storage unit. Thus, the read lasers can be utilized to correspond to the laser input intensity to read three-dimensionally at one bit location of the storage system.

Chemical or electrochemical erasure of the stored information in a total or bit-wise manner is possible by temporary conversion of the insulating forms of sulfonated polyaniline (e.g. Na+ salt) to the conducting form of the sulfonated polyaniline film.

The temperature for erasure of the photoinduced information is one of sulfonated controllable by judicious choice of the N or ring substituent. For example, use of polyortho-toluidine and naphthal versions of sulfonated polyaniline in the emeraldine equivalent oxidation state polyaniline will provide stability to higher temperatures, likely exceeding room temperature. Hence, some of these derivative systems will be usable at room temperature, with erasure occurring above room temperature.

EXAMPLE

The sulfonated polyaniline medium used for information storage may also be combined in composite form with other polymers to blend mechanical and optical storage function. The density of optical storage is limited only by the diffraction limits of the writing and probing beams utilized.

EXAMPLE

Sulfonated polyaniline salt composition films can be used to produce holographic images and photoinduced grating in a two-dimensional framework. The two-dimensional framework is a sample configuration of a sulfonated polyaniline film supported by a transparent substrate. Two beams interfere in the sulfonated polyaniline film. For example, utilizing the emeraldine base form (e.g., Na+ salt), the two beams are focused low power Helium-Neon laser beams operating at 632.8 nm. The interference of the two beams results in an interference pattern or holographic image within the emeraldine base form polymer. This interference or holographic image is then read conveniently by inexpensive, compact, semiconductor diode lasers operating at 800 nm, 1300 nm or 1550 nm.

EXAMPLE

Sulfonated polyaniline salt compositions can be used in three-dimensional holographic and photoinduced grating applications. A thick sample of sulfonated polyaniline or sulfonated polyaniline can be dispersed in a transparent host polymer such as kapton or polycarbonate. Two beams interfere in the sulfonated polyaniline film. For example, utilizing the emeraldine base form (Na+ salt) the two beams are focused low power He—Ne laser beams operating at 632.8 nm. The interference of the two beams results in an interference pattern or holographic image within the emeraldine base form polymer by inexpensive, compact, semiconductor diode lasers operating at 800 nm, 1300 nm or 1550 nm.

While the invention has been disclosed in this patent application by reference to the details of preferred embodiments and examples of the invention, it is to be understood that this disclosure is intended in an illustrative rather than in a limiting sense, as it is contemplated that modifications will readily occur to those skilled in the art, within the spirit of the invention and the scope of the claims which follow.

We claim:

1. A sulfonated polyaniline composition having recurring units of formula I

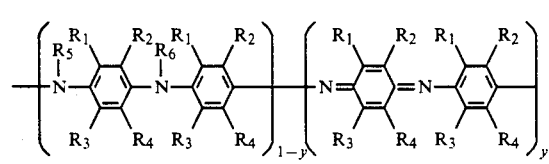

wherein $0 \leq y \leq 1$, $R_1$, $R_2$, $R_3$, $R_4$, $R_5$ and $R_6$ are independently selected from the group consisting of H, $-SO_3H$, $-R_7SO_3H$, $-SO_3M$, $-R_7SO_3M$, $-OCH_3$, $-CH_3$, $-C_2H_5$, $-F$, $-Cl$, $-Br$, $-I$, $-N(R_7)_2$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1$-$C_8$ alkyl, aryl or aralkyl group, wherein M is a positive cation; the sulfonated polyaniline composition being comprised of x and z fractions of phenyl or quinoid rings, wherein x is that fraction of phenyl or quinoid rings that have an $-SO_3^-$ group and wherein z is that fraction of phenyl or quinoid rings that have an $-SO_3^-$ group and the M positive cation; such that when the sulfonated polyaniline composition has fewer z fractions than x fractions, the composition is a conductor and as the number of z fractions approaches the number of x fractions, the composition becomes nonconducting.

2. The composition as claimed in claim 1, wherein the fraction of rings containing at least one $R_1$, $R_2$, $R_3$ or $R_4$ group being an $-SO_3M$, or $-R_7SO_3M$ varies from approximately 20 percent to one hundred percent.

3. The composition as claimed in claim 1, wherein the sulfonated polyaniline composition is of weight average molecular weight in the range of from approximately 300 (oligomers of sulfonated polyaniline) to in excess of 100,000.

4. The composition as claimed in claim 1, wherein $R_1$ is selected from the group consisting of $-SO_3M$, and $-R_7SO_3M$ and $R_2=R_3=R_4=H$ and $y \sim 0.5$.

5. The composition as claimed in claim 1, wherein M is selected from the group consisting of $Li^+$, $Na^+$, $K^+$, $Rb^+$, $Cs^+$, $NH_4^-$, $Ca^{++}$, $Ba^{++}$.

6. The composition as claimed in claim 1, wherein $z=1$.

7. A process for producing the polyaniline composition of claim 1 comprising reacting a self-doped sulfonated polyaniline polymer with an aqueous basic solution.

8. The process according to claim 7 in which the reaction is conducted at about room temperature.

9. The process according to claim 7 in which the reaction is carried out in air.

10. The process according to claim 7 in which the polyaniline polymer has a predetermined chain length which is not reduced in length during the reaction.

11. A sulfonated polyaniline salt composition of formula I of claim 1 for use as an interim material in making a self-protonated sulfonated composition.

12. A composition for absorbing electromagnetic radiation, wherein the electromagnetic radiation possesses a wavelength generally in the range of from about 1000 Angstroms to about 50 meters, wherein the composition comprises a sulfonated polyaniline salt composition of the formula I of claim 1.

* * * * *